US005483579A

United States Patent [19]
Stogel

[11] Patent Number: 5,483,579
[45] Date of Patent: Jan. 9, 1996

[54] VOICE RECOGNITION DIALING SYSTEM

[75] Inventor: Scott S. Stogel, Waban, Mass.

[73] Assignee: Digital Acoustics, Inc., Waban, Mass.

[21] Appl. No.: 23,791

[22] Filed: Feb. 25, 1993

[51] Int. Cl.[6] .................................................. H04M 1/515
[52] U.S. Cl. ............................ 379/88; 379/216; 379/355
[58] Field of Search .................................... 379/351, 361, 379/67, 88, 89, 216, 355, 92; 381/46

[56] References Cited

U.S. PATENT DOCUMENTS

| | | | |
|---|---|---|---|
| 4,027,102 | 5/1977 | Ando et al. | 381/46 |
| 4,521,647 | 6/1985 | Olson et al. | 379/351 |
| 4,578,540 | 3/1986 | Borg et al. | 379/40 |
| 4,644,107 | 2/1987 | Clowes et al. | 379/354 |
| 4,653,086 | 3/1987 | Laube | 379/96 |
| 4,677,569 | 6/1987 | Nakano et al. | 395/2.84 |
| 4,704,696 | 11/1987 | Reimer et al. | 395/2.84 |
| 4,776,016 | 10/1988 | Hansen | 381/42 |
| 4,837,808 | 6/1989 | Immendorfer et al. | 379/96 |
| 4,853,953 | 8/1989 | Fujisaki | 379/88 |
| 4,870,686 | 9/1989 | Gerson et al. | 381/43 |
| 4,928,302 | 5/1990 | Kaneuchi et al. | 379/88 |
| 5,007,081 | 4/1991 | Schmuckal et al. | 379/354 |
| 5,036,539 | 7/1991 | Wrench, Jr. et al. | 381/43 |
| 5,046,099 | 9/1991 | Nishimura | 381/43 |
| 5,050,215 | 9/1991 | Nishimura | 381/41 |
| 5,054,054 | 10/1991 | Pessia et al. | 379/89 |
| 5,111,501 | 5/1992 | Shimanuki | 379/355 |
| 5,148,484 | 9/1992 | Karu et al. | 381/46 |
| 5,319,703 | 6/1994 | Drory | 379/351 |

FOREIGN PATENT DOCUMENTS

| | | | |
|---|---|---|---|
| 58-197947 | 11/1983 | Japan | 379/74 |
| 2-56600 | 2/1990 | Japan | 379/88 |

OTHER PUBLICATIONS

Speech Recognition Processor (Product Brochure), 5 pages, DSP Group, Inc., Jan. 1991.
"Building–Block Circuits Simplify Integration on Voice–Input Systems", M. Jones, *Computer Technology Review*, Jan. 1983, No. 1, pp. 63–67.
Data Sheet Linear Technology—LTC 1062CS—5th Order Low Pass Filter (undated).
Data Sheet Sierra Semiconductor—SC11290—DTMF Transceiver with Call Progress Detection (undated).
Data Sheet AT&T—Product Note—Speaker–Trained Voice Recognizer, Mar. 1992.
Data Sheet AT&T—Module Components—Speaker–Trained Voice Recognizer, Mar. 1992.

*Primary Examiner*—Thomas W. Brown
*Attorney, Agent, or Firm*—Fulbright & Jaworski

[57] ABSTRACT

A telephone line may be provided with an automated voice recognition dialer system. A voice recognition telephone dialing system can be constructed with a dial tone elimination circuit connected to the telephone line. The utilization of a dial tone elimination circuit will eliminate the "noise" of a dial tone from consideration by a speech processing circuit which may be set up to analyze voice commands and generate appropriate responses such as dial tone generation or synthesized speech responses. In this manner, a single voice dialer may be utilized regardless of the number of telephones on a line.

18 Claims, 10 Drawing Sheets

VOICE RECOGNITION DIALING SYSTEM

BACKGROUND OF THE INVENTION

1. Field of the Invention

The invention relates to an automated dialing system and, more particularly, to an advanced voice recognition dialing system.

2. Background of the Invention

Speech or voice recognition devices are known. A speech recognition device can be used to activate a number of tasks, including a telephone. Prior voice recognition dialing systems have been disclosed which are off-line or disconnected from a telephone line during the recognition mode. This is a serious limitation to the use of the prior systems in that they must be dedicated to a single telephone.

SUMMARY OF THE INVENTION

It is an object of the invention to provide an automated dialing system which is voice activated or triggered and includes voice recognition capabilities. It is a further object of the invention to provide a voice activated dialing method. It is a further object of the invention to allow any telephone on a given line to take advantage of a single voice recognition dialing system. It is a further object of the invention to provide a system which may be installed either at a central switching location or in the location of the telephones. These objects are achieved by a voice recognition system which monitors a telephone line and eliminates the influence of the dial tone signal, either by a filter or otherwise from the voice recognition element.

In operation a user may lift any handset connected to the same telephone line as the voice recognition dialing system. The user will hear the telephone dial tone and have the choice of either dialing in the normal fashion or speaking a preprogrammed voice command corresponding to a desired dialing sequence. According to the invention, the first step may be to verify that a telephone line is in a dial-ready state. This may be done by checking whether the telephone is off-hook and either has a dial tone or was not ringing immediately prior to going off-hook. The next step is to input a voice instruction over the dial tone. The dial tone signal is then eliminated from the speech and analyzed by a voice processor or recognizer. If the voice instruction matches a previously stored speech pattern, a prestored dialing sequence corresponding to the recognized pattern is generated. The step of eliminating may be performed by filtering, using a filter circuit, phase cancellation or digital signal processing algorithms or masks.

A voice recognition telephone dialing system can be constructed with a dial tone elimination circuit connected to a telephone line. The elimination circuit may be connected to an input of a voice recognition unit. Advantageously, a dialing signal generator may be connected responsive to the voice recognition unit with an output connected to the telephone line. One method of implementing the elimination circuit is by a band reject filter such as a high "Q" notch filter. Advantageously, two or more filters may be used in view of the existence of two discrete standard dial tone frequencies of 350 Hz and 440 Hz in operation.

DETAILED DESCRIPTION OF THE PREFERRED EMBODIMENT

Figure 1:
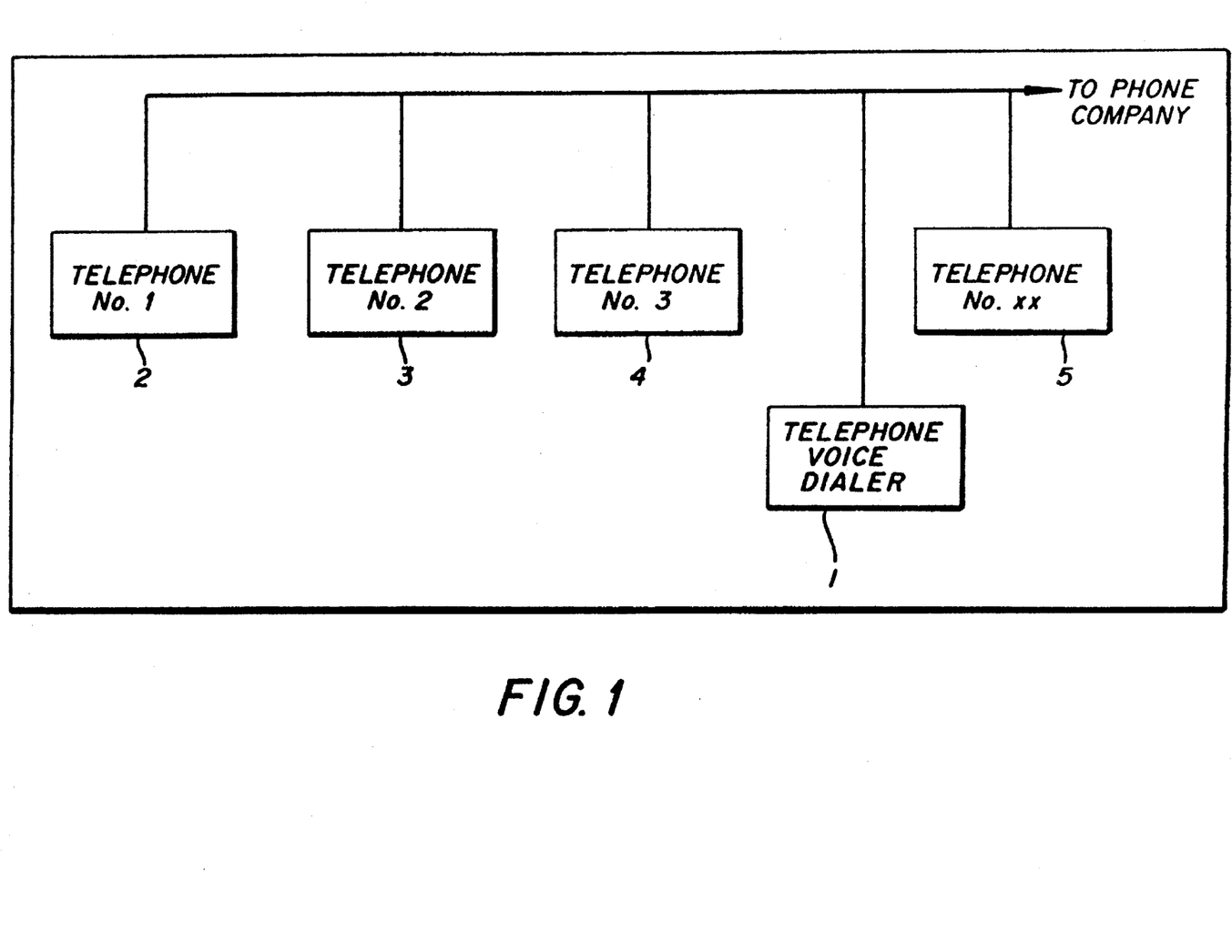
FIG. 1 shows an installation with a voice recognition dialing system.

According to a preferred embodiment of the invention, a telephone voice dialer may be provided with voice recognition capabilities in a small housing and a single primary connection to the telephone system. As shown in FIG. 1, the telephone voice dialer 1 can be attached to the telephone line. This may be done, advantageously, by a standard RJ11 modular jack or any other suitable connection. Once connected, the voice dialer effectively monitors all telephones connected to the telephone line.

Advantageously, when any telephone 2–5 on a line is picked up, the system will be activated. After lifting a telephone handset, a user may speak a preprogrammed instructions such as, for example, a name of an individual they wish to dial. The user speaks over the normal dial tone generated in a telephone system. The voice dialer will reject the dial tone element and decode the verbal instruction in the recognizer. If the instruction is recognized, the voice dialer will initiate the dialing sequence or other operation. Advantageously, if the voice dialer does not recognize the instruction, it may go "off-line" and not interfere with the operation of the telephone.

The system allows all of the telephones connected to a single telephone line to take advantage of voice dialing features utilizing a single voice dialer connected to the telephone line anywhere in the user installation. The system can be easily programmed by a user to recognize speech patterns and dial a telephone number corresponding to the name. In addition, the system may be programmed to recognize patterns and take other appropriate actions. For example, the system may be programmed to dial 911 upon recognition of the word "emergency." The system may also be programmed to dial long distance carrier access and calling card codes upon recognition of an appropriate instruction such as AT&T, MCI, or Sprint. The system may also give the user the date or time upon recognition of a pre-programmed pattern. Another possibility is the operation of other appliances connected to the telephone line such as an answering machine, an interface for a security system, or an interface for a stereo or TV control.

The system can advantageously be constructed from readily available components. The primary components of the system include notch filters available from linear technology such as an LTC1062CS Fifth Order Low Pass Filter, a DTMF Transceiver with Call Progress Detection available from Sierra Semiconductor under the designation SC11290, and the voice processor or recognition circuit may be a D6006 Speech Recognition Processor available from the DSP Group, Inc. or a Speaker Trained Voice Recognizer such as the DSP16A1 available from AT&T Microelectronics. The system may also include any suitable commercially available microprocessor. Those of ordinary skill in the art will readily recognize the other components in the system. In addition, the system may also be constructed utilizing voice and control processing equipment installed in or connected to a personal computer.

The voice processor may be a special purpose speech recognition processor capable of performing isolated words speech recognition and using speech synthesis prompts for guidance and verification. The voice processor may be controlled by a host microprocessor controller. Advantageously, the voice processor is language independent and capable of recognizing user defined words. A processor may have capabilities for speech prompting, for guidance and verification, and may include an onboard read-only memory, a memory template, a digital signal processor, and a processor host interface. The voice processor may also have an output to a loudspeaker amplifier and input from a microphone amplifier. Preferably, the speech processor will have a training mode and a recognition mode. In the training mode, user templates are created for an input recognition session. In addition, user defined phrases may be compressed for verification during a recognition session. In the recognition mode, a speech input may be recognized for generation of a dialing sequence.

Training is performed by capturing and sampling user defined words and transforming them into word templates used throughout the recognition process. The recognition procedure is similar to the training procedure up to the stage of feature extraction. Then a pattern recognition algorhythm is used to calculate a distortion measure between the test and the reference templates. A decision rule is used to select the best matching template. During sampling, a data acquisition process is used in which an analog speech signal is sampled and quantized to a digital representation. The recognition of a speech recognizer is usually highly dependent on the end point detection accuracy. Different voice recognition processors may be utilized and are equivalent to the described processor.

According to the preferred embodiment, the voice dialer may be programmed from any telephone connected to the same line as the voice dialer. The user may invoke a programming mode by an appropriate instruction, such as keying a combination on a telephone key pad. Once in the programming mode, the user may be instructed in programming steps via an artificial computer generated voice in a fashion similar to that now being used in automated call routing systems. After speaking a recognition "key word," the computer voice may direct the user to enter the appropriate digits on a telephone key pad to be retained for future dialing. An advantageous feature of the invention is the utilization of a filter in combination with voice recognition chip technology to create a stand-alone device which may be utilized as an automated voice dialer on a telephone line from any telephone connected to the line. According to the invention, the user can obtain the advantages of voice recognition dialing from telephones located anywhere in a home or office, even though there is only a single voice dialer unit located remotely from the user.

The invention is not restricted to generating dialing sequences for placing telephone calls. Advantageously, the system may be integrated into an answering machine, facsimile transmission system, modem or voice-mail system (or personal computer card) designed to incorporate voice dialing features. Advantageously, the system may be integrated with a telephone answering machine specifically designed for voice recognition operation.

Figures 2, 2A:
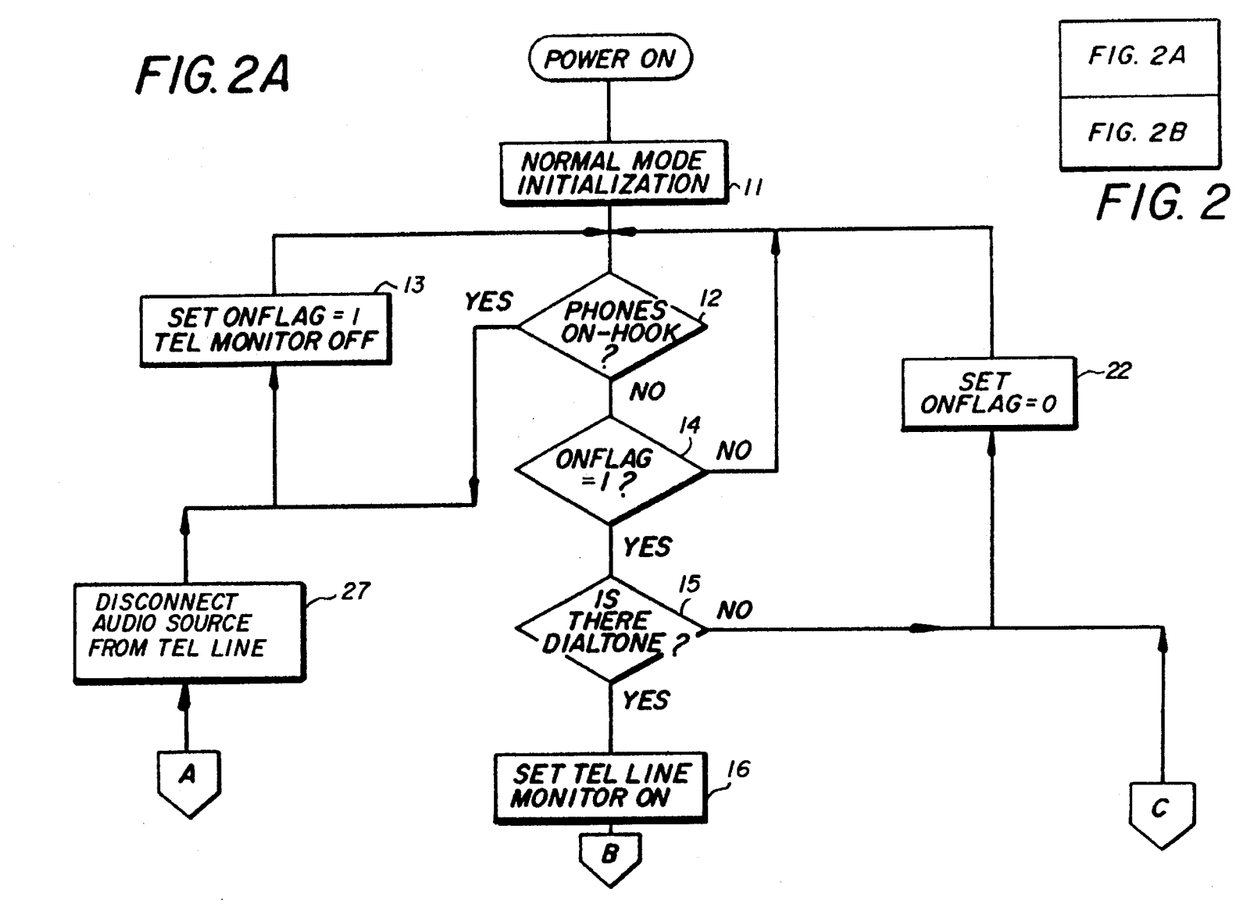
FIG. 2 shows a flow chart of an embodiment of a dialing method according to the invention.
Figure 2B:
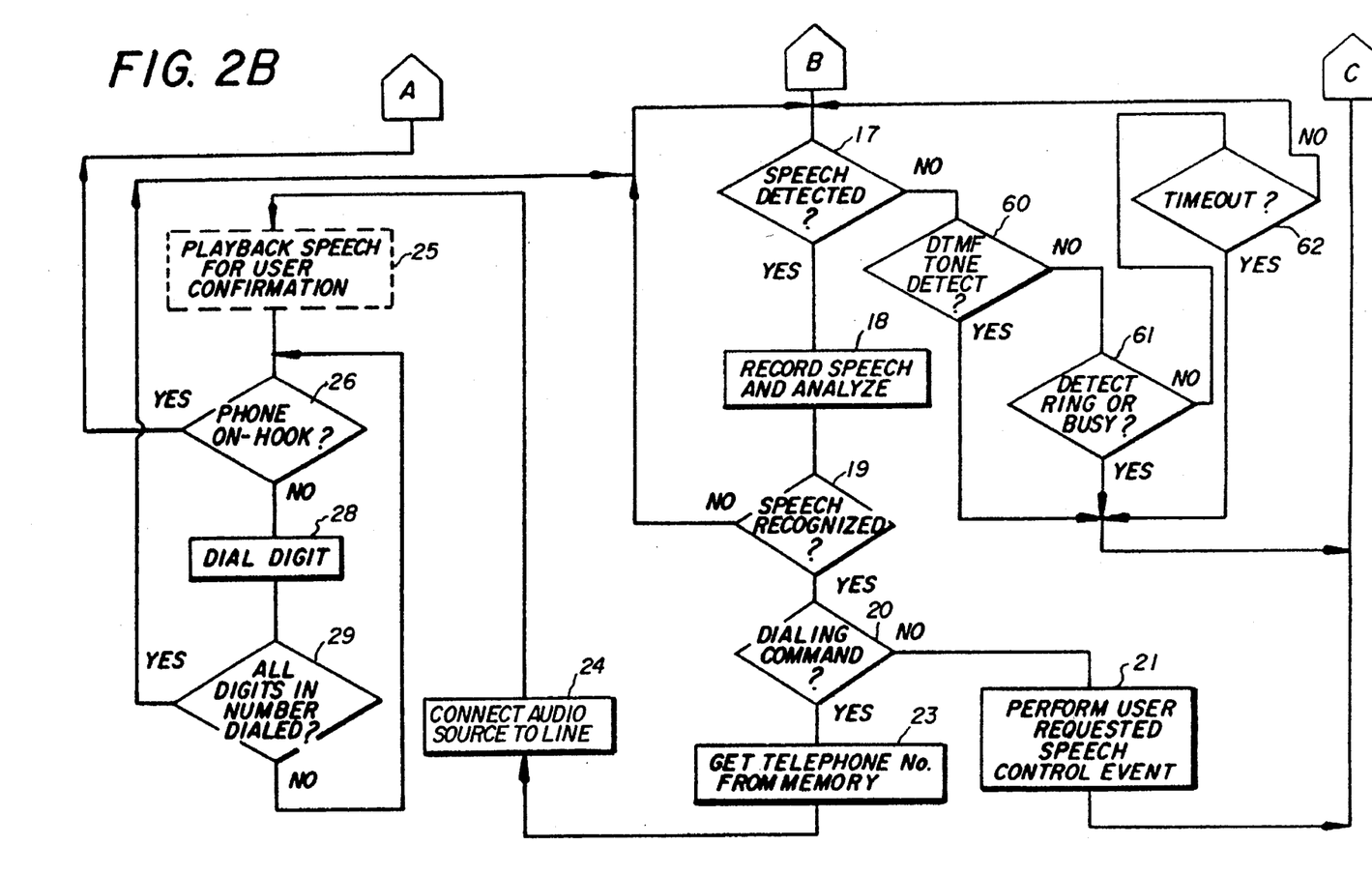

FIG. 2 shows a flow chart of the operation of the voice dialer according to a preferred embodiment. Advantageously, operation is initiated upon providing power 10 to the voice dialer system. After power is provided, the system flags are initialized 11. The system then determines whether all telephones are on-hook, i.e., not in use 12. The telephone line is monitored for all voltage levels. By monitoring the telephone lines the system can determine when any telephone on the line is picked up ("off hook"), when the telephone is ringing, when there is a dial tone or when an outgoing call results in a ring or a busy signal.

If all telephones connected to the same telephone line are on-hook (not in use), then the system is placed in a wait mode, or a stand-by/idle mode, and will continuously loop. If any telephone on the line has a handset lifted, this will be detected by the voltage level or loop current detection of the line and the program will set a "ON FLAG" variable 13. Upon a determination that the telephone line is not in an on-hook state, the ON FLAG is monitored 14. If the ON FLAG is not set to 1, the on-hook monitor loop continues. If the ON FLAG is set to 1, then the system inquires as to the status of the telephone line. The inquiry can take one of several forms. The system can monitor the line to determine the presence of a dial tone upon lifting of the handset 15. If the handset is lifted in response to an incoming call, no dial tone signal will be detected. If, however, the handset is lifted by a user intending to place a call, there should be a dial tone on the line. Furthermore, dialing instructions would not be appropriate if no dial tone were on the telephone line. Alternatively, the system may inquire as to whether the telephone was ringing by utilizing a ring monitor to set a ring flag and a clock to time out the prior ring signal. If the line sensor has detected an incoming ring within the prior time limit, that signifies that the lifting of the handset was in response to an inbound call and the system should remain in the stand-by/idle mode. If no ring had been detected, then the system assumes that the handset was lifted in order to place a call and the voice recognition circuitry should be connected to the telephone line and the line should be monitored for speech instructions.

Once the system determines that a call is likely to be placed, the voice recognition unit is set to monitor the telephone line 16. Next, the system determines if any speech or audio input is detected 17. The user, upon lifting the handset, hears the dial tone in the handset ear telephone or over the speaker if in the speaker telephone mode. The dial tone may be electronically removed using a filter, phase canceler, or digital signal processing programs so that the system can efficiently detect whether there is any speech over the telephone line and not be confused by a dial tone. The presence of a dial tone would prevent a voice processor from isolating a user voice and correlating it to a preprogrammed pattern.

Upon detection, a speech pattern will be recorded and analyzed 18. If the speech pattern is recognized 19, i.e., matches a preprogrammed speech pattern stored in memory, then an event such as dialing signal generation can occur. According to an advantageous embodiment of the invention, the system may determine whether the event is a dialing command 20 or other command. If the event is not a dialing command, the system will perform the user requested speech controlled event 21, set the ON FLAG back to 0 22, and re-enter the on-hook monitoring loop. If the recognized speech contains a dialing command, the system may retrieve the number associated with the recognized speech pattern from memory 23. Advantageously, the system may connect a signal to allow a DTMF tone generator to send touch tones over the telephone line 24. According to an advantageous embodiment, the pre-recorded speech that corresponds to the recognized speech pattern may be played back to the user over the handset in order to allow the user an opportunity to confirm that the system has identified and matched the speech pattern with the intended stored event 25. For example, if the user intends to utter the word "office" in order to dial their office but the system recognizes the command as another instruction such as "home," the system will play back the prestored pattern corresponding to the recognized voice instruction and the user will have an opportunity to determine whether a recognition error has occurred.

If the user desires to abort the call during the dialing process, the user may simply hang up the telephone or momentarily depress the "hook switch." This could be used if there was a recognition error determined during the confirmation step or for any other reason the user desires to abort the call. The system monitors whether all telephones on the line are on-hook to make this abort determination 26. If all telephones on the line are on-hook, the audio relay or source is disconnected from the telephone line 27 and the system returns to stand-by/idle mode and the telephone line on-hook loop. Otherwise, the next step is to dial the digits 28. The system will automatically dial all of the preprogrammed digits until the number is completed 29. During the dialing process, the system will continue to loop through a telephone line on-hook monitor to determine if dialing should be aborted at any point. Once all of the digits in the number are dialed, the system returns to the speech detection inquiry. This will allow subsequent speech recognition instructions. This may be utilized advantageously to initially enter a long distance carrier and calling card codes. Once the carrier and calling card codes are dialed, the system is available to recognize a second instruction such as a pattern corresponding to a preprogrammed telephone number. If no speech is detected at the speech detection inquiry, a series of other inquiries may be made to enhance the operation. These inquiries include a monitor of the presence of a DTMF tone 60 or other indication of dialing. If the user institutes manual dialing, then the system assumes the user will complete dialing and voice recognition is disabled. The system will then go back to the stand-by/idle mode and on-hook loop. The next inquiry is a busy or "ringback" signal 61. A ringback indicates a called number is ringing. If such a signal is detected, then the system will know that the dialing sequence has been successfully completed and again will go to a stand-by/idle mode so that no further speech recognition will be attempted. Advantageously, the system may also include a time out inquiry 62. If speech does not commence within a few seconds, the system will return to the stand-by/idle mode and disable recognition.

If a busy signal is received, the system may be programmed by a simple pattern such as "redial" to go into a redial mode in order to periodically retry the number.

Upon determination that the recognized command is not a dialing command, the system will carry out that command. An example of a non-dialing command would be a time inquiry. If a user lifts a handset and the system recognizes a preprogrammed speech pattern for time, it can trigger a synthesized speech response of the time of day playback. Alternatively, the user can command different memory speech patterns to be enabled or disabled (much like selecting a new telephone book or directory). Optionally, this event may be reserved for the program mode.

Figures 3, 3A:
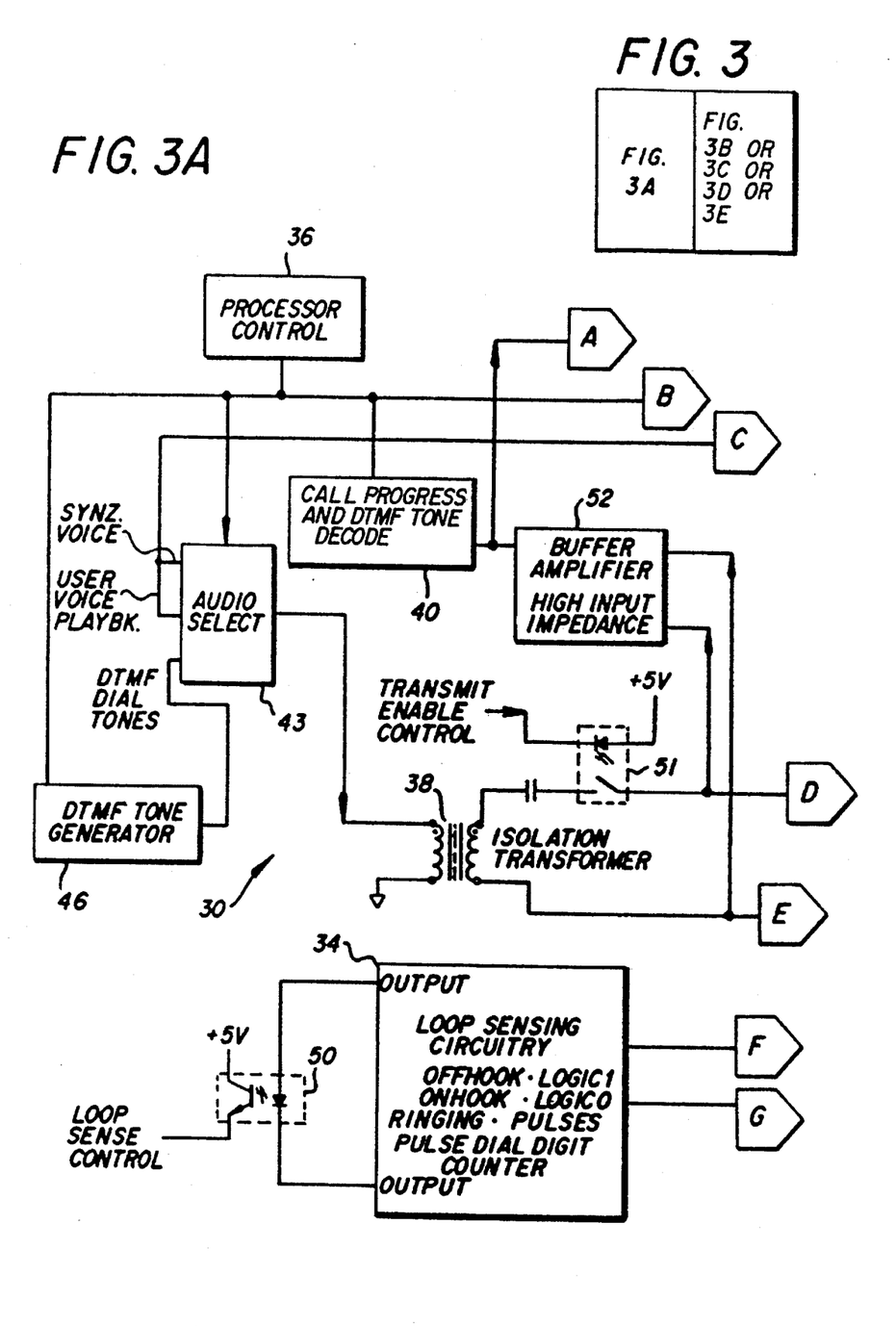
FIGS. 3A and 3B, related as indicated in FIG. 3, show a schematic of a voice recognition dialer.
Figure 3B:
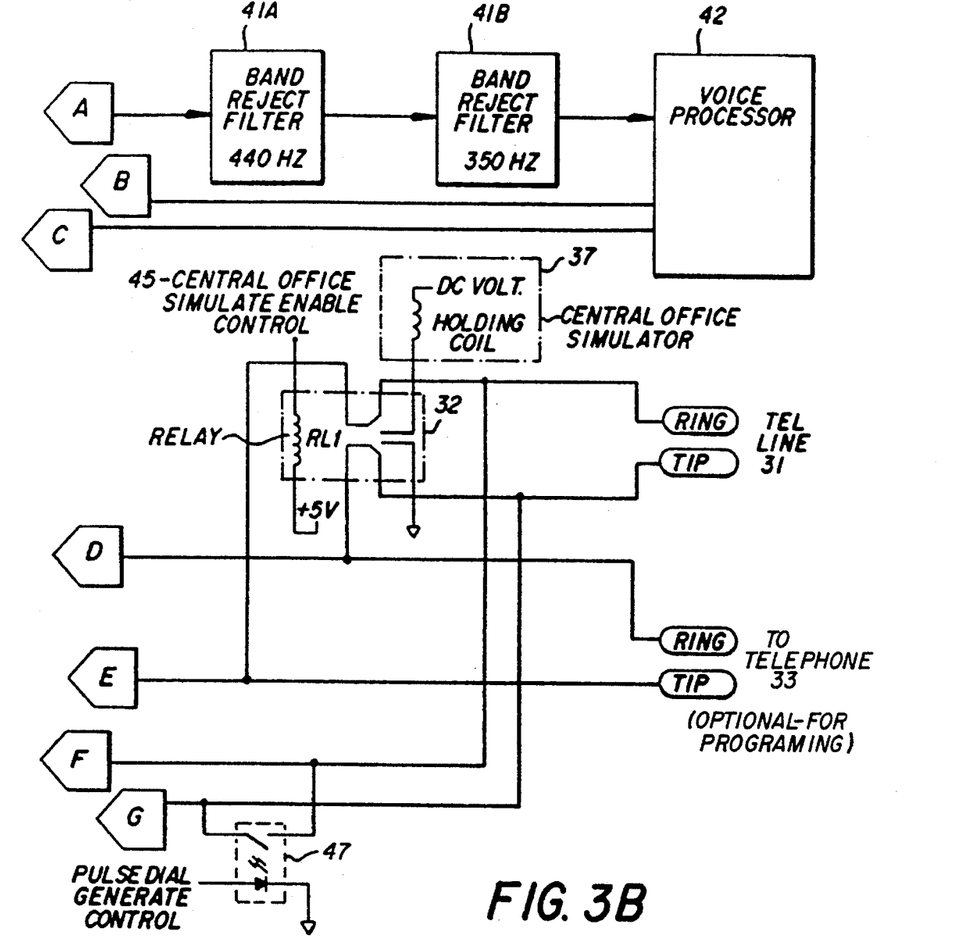
Figures 4, 4A:
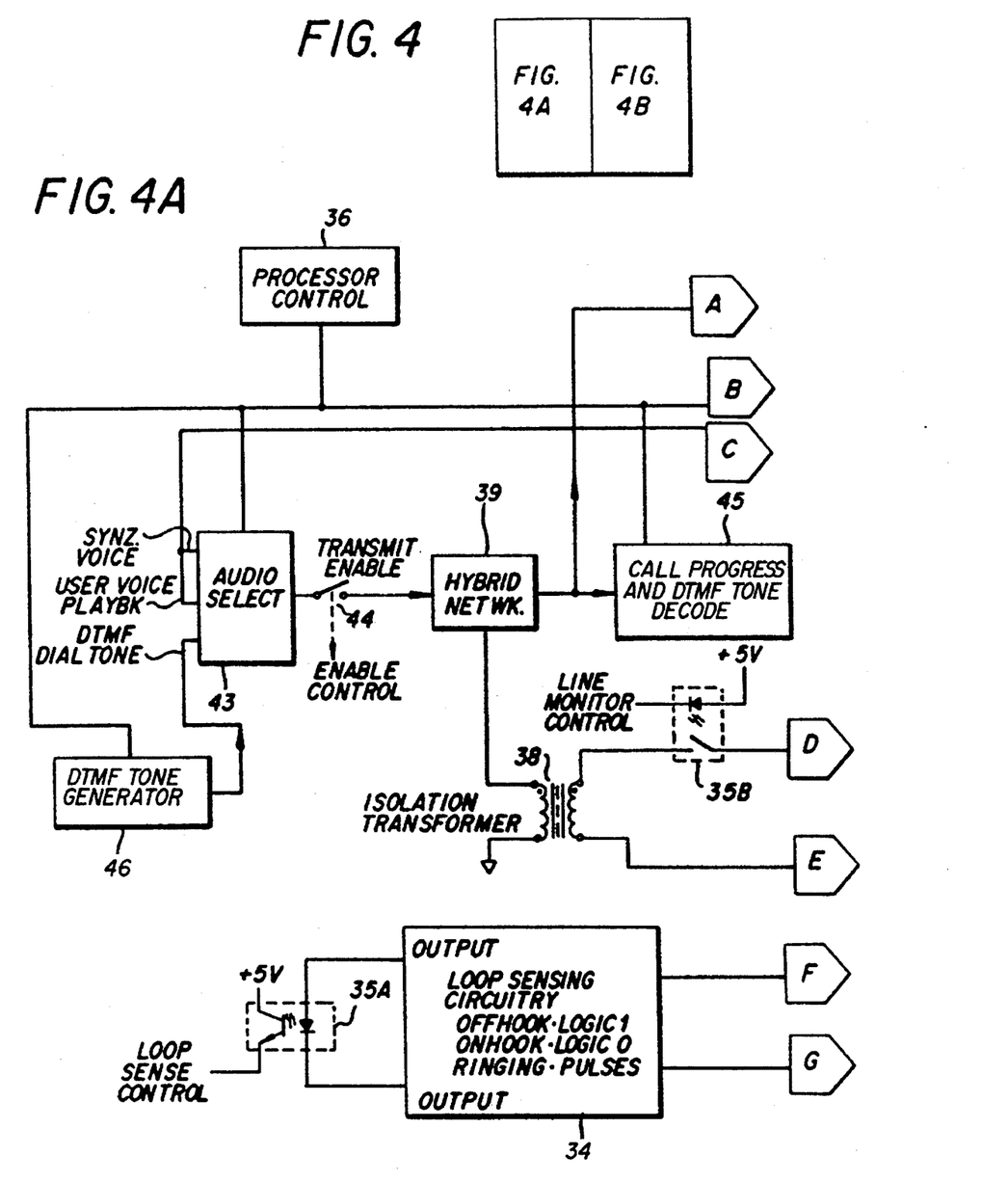
FIG. 4 shows a schematic of an alternative embodiment of a voice recognition dialer.
Figure 4B:
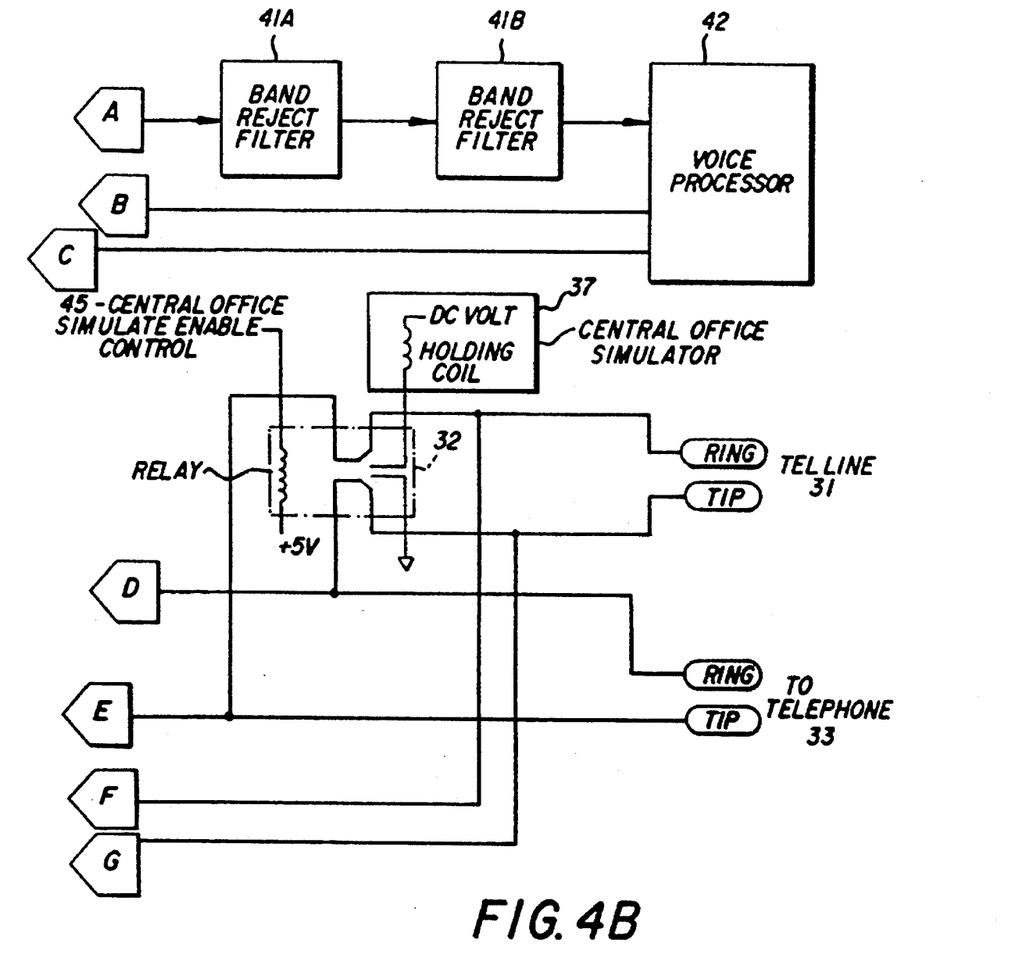

FIGS. 3 and 4 show a voice recognition dialing system according to the invention. Like features are assigned the same reference numbers. The voice recognition dialing system 30 may be connected to a telephone line 31 by a double pole, double throw relay 32. According to one embodiment, a telephone outlet 33 may be connected to the common legs of the relay 32. A loop sensing circuit 34 will be connected to the telephone line 31. A loop sensing circuit will provide a logic 1 output for an off-hook condition and a logic 0 output for an on-hook condition. The loop sensing circuit may also provide a series of pulses during a ringing condition. Advantageously, the loop sensing circuit may be implemented utilizing a voltage sensitive decoding circuit.

According to one embodiment, shown in FIG. 3, the output of the loop sensing circuit may be advantageously connected to an opto-coupler 50. An output of the opto-coupler is connected to the microprocessor controller 36 in order to inform the microprocessor when any telephone on the circuit is off-hook, on-hook, or in a ringing state. The loop sensing circuit 34, in combination with the opto-coupler, may also be utilized to allow the microprocessor controller to count pulse dial digits. A second optically coupled circuit 51 is a switch controlled by a transmit enable control signal derived from the microprocessor. The switch 51 is closed during any transmission to the telephone or telephone line such as a synthesized voice, a user voice playback, or DTMF dial tones. The telephone line 31 and telephone connection 33 are connected to a buffer amplifier 52 with a high impedance input. The circuit may advantageously be an AC coupled circuit whose output feeds the reject filters 41A and 41B and the call progress and DTMF tone decode 40. The buffer amplifier circuit 52 operates to comply with telephone company device isolation requirements and to convert the unreferenced telephone inputs to a locally referenced signal.

Alternatively, as shown in FIG. 4, the output of the loop sensing circuit 34 may be connected to an optically linked relay. The optically linked relay or opto-coupler may include a sensor portion 35A and a switching portion 35B. The sensor portion has a loop sense control output which may be provided as an input to the microprocessor control unit 36. The optically linked relay switching portion 35B has a line monitor control connected to the microprocessor controller 36. Alternatively, the switching portion may be directly connected to the sensor portion. The switching portion when activated closes a switch connecting the telephone outlet 33 and telephone line 31 or the central office simulator 37 to an isolation transformer 38, depending on the status of the double pole, double throw relay 32. The isolation transformer 38 is connected to a hybrid network 39 provided in order to separate the bi-directional telephone line signals into unidirectional receiving and transmitting signals. An output of the hybrid network 39 is connected to the call progress and DTMF tone decode unit 40 and the dial tone blocking circuits 41A and 41B.

Figure 3C:
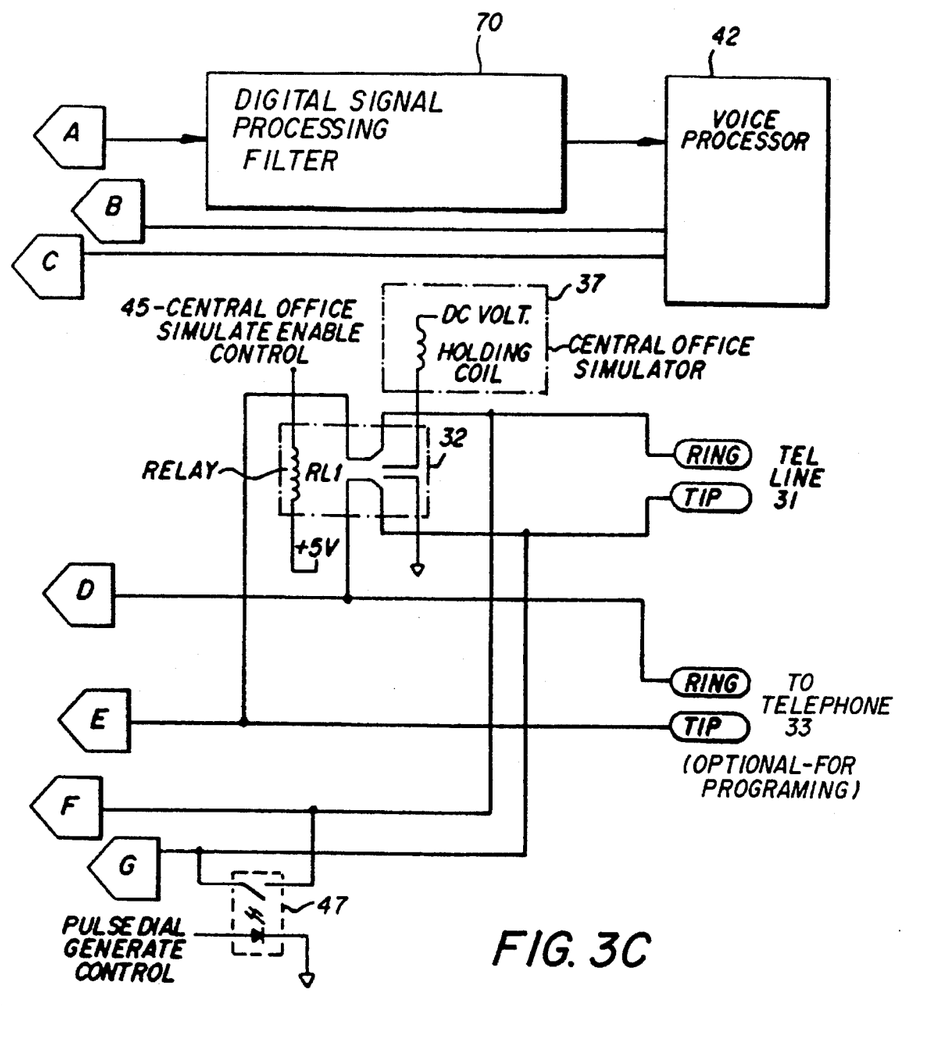
FIGS. 3C, D and E show alternative configurations to that shown in FIG. 3B.
Figure 3D:
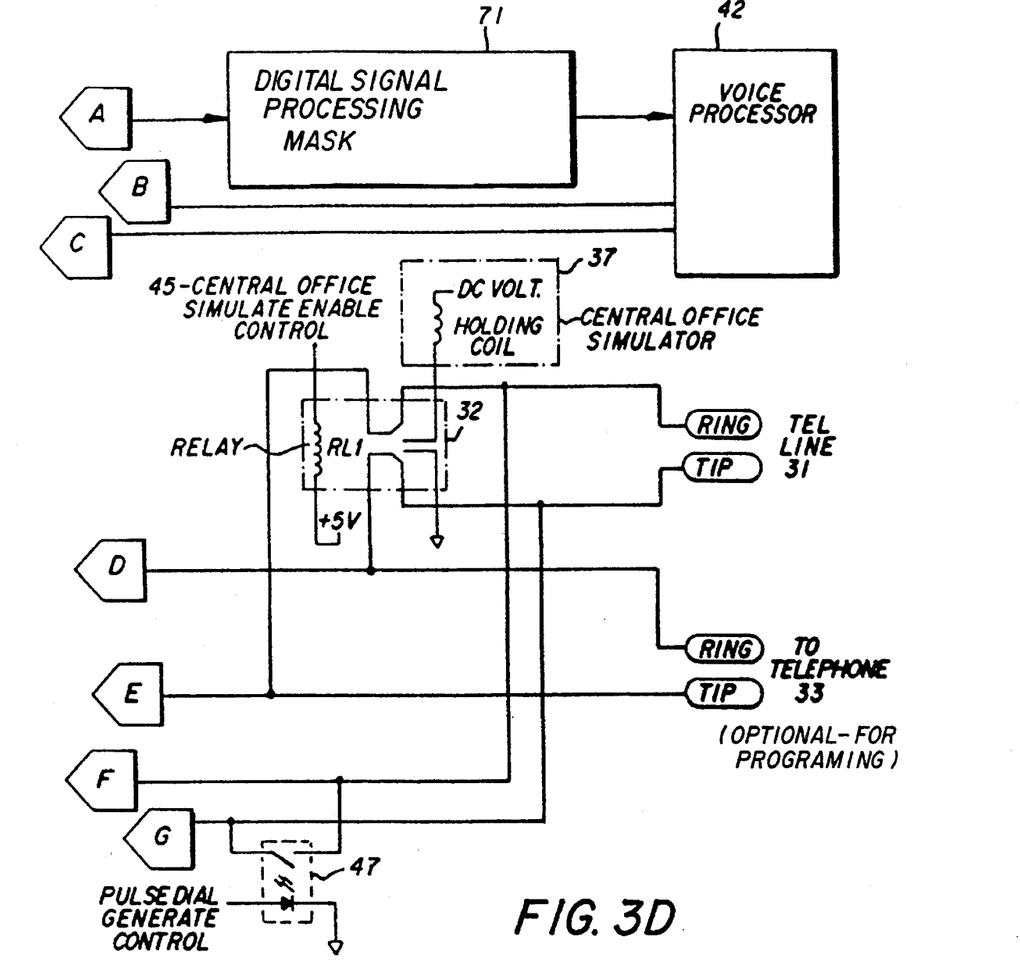
Figure 3E:
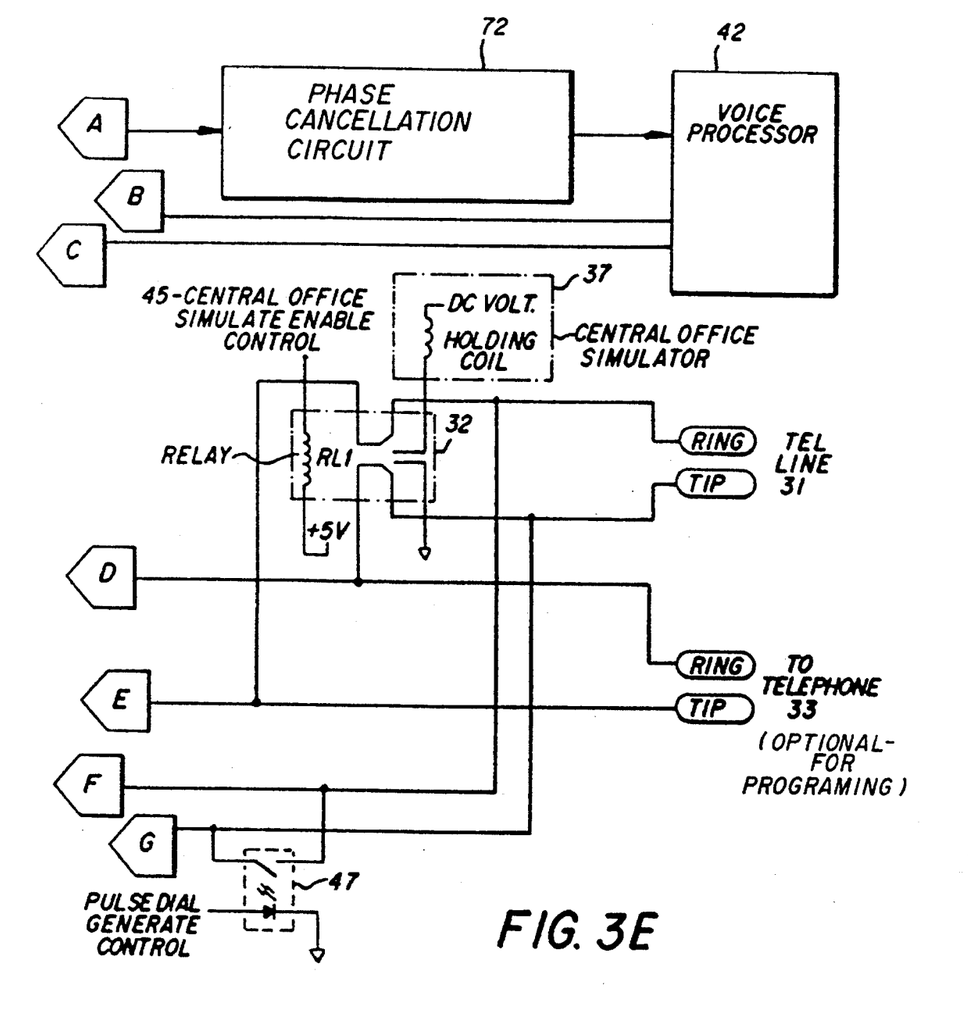

The call progress and DTMF tone decode unit 40 may advantageously be implemented by the DTMF receiver portion of a DTMF Transceiver With Call Progress Detectors such as the Sierra Semiconductor SC11290 discussed above. The dial tone blocking filters 41A and 41B may advantageously be narrow band-pass or notch filters as described above. These filters are provided to block the dial tone from reaching the voice processor recognizer circuitry. The dial tones for telephone systems are specific predetermined frequencies such as 350 HZ and 440 HZ. In an alternative configuration, the dial tone blocking circuit may be a digital signal processing filter 70 as shown in FIG. 3C, a digital signal processing mask 71 as shown in FIG. 3D, or a phase cancellation circuit 72 as shown in FIG. 3E.

A voice processor circuit 42, including recognition capabilities, is advantageously connected to an output of the dial tone blocking circuit 41. A voice output of the voice processor circuit may advantageously be connected to a synthesized voice input and a user voice playback input of an audio select unit 43. The audio select unit 43 may also be connected to a DTMF generator 46 which may be the DTMF generator portion of a DTMF transceiver as described above. The microprocessor control outputs control which signal is switched through the audio select unit 43 and instructions to the DTMF generator 46. According to an advantageous configuration, the tone generator output may be connected to an input of a summing amplifier. The second input of the summing amplifier may be the synthesized voice and user playback inputs. An output of the audio select unit 43 is connected to a transmit enable switch 44 controlled by an enable control input. The enable control input may be provided by the microprocessor controller 36. When the transmit enable switch 44 is closed, the audio select unit 43 is connected to an input of the hybrid network 39.

The double pole, double throw relay 32 is controlled by a central office simulate enable control 45. This control signal may be provided by the microprocessor controller 36 when the system is placed into a program or set-up mode. During the set-up mode, the voice recognition system should be disconnected from the telephone line. When the relay 32 is thrown, the telephone line is disconnected and a central office simulator 37 is connected. This primarily operates to insure that no telephone numbers are dialed to the telephone line from the primary telephone, connected to the telephone outlet 33, during the programming mode. It also may be utilized to provide a simulated dial tone to approximate the conditions during normal operations. The audio programming input to the voice recognition circuit will be through a filtered out simulated dial tone in order to approximate the dial tone which will be present during normal operation. Advantageously, the voice dialer is buffered from the telephone line as a high impedance AC coupled circuit.

According to an alternative embodiment, a dial pulse generator circuit may be provided either in addition to or as an alternative to the DTMF generator. An optically coupled relay switch 47 controlled by the microprocessor controller 36 may serve to generate pulse dial signals. The provision of a dial pulse generator circuit will enable the system to operate on both tone and pulse telephone lines. When in a pulse dial configuration, the voice dialer may be dedicated to a single telephone.

According to a further alternative embodiment, the voice recognition dialer may be installed on the telephone line at a central switching location. Such a configuration would enable a telephone service carrier to offer voice recognition dialing as an additional service.

It is to be understood that the description of the preferred embodiment is not intended to limit the invention. Those of ordinary skill in the art will recognize that various alternatives are within the scope of the invention.

I claim:

1. A method for effecting telephone dial signaling, comprising the steps of:

verifying that a telephone line is in a dial-ready state;

inputting a voice instruction over a dial tone signal onto a telephone line;

rejecting the influence of a dial tone signal from reaching a voice recognizer while passing at least a portion of said voice instruction to said voice recognizer;

recognizing said portion of said voice instruction; and generating a prestored dialing sequence corresponding to said voice instruction upon recognition.

2. A method according to claim 1, wherein said step of verifying further comprises the step of determining the hook status of said telephone line.

3. A method according to claim 1, wherein said step of rejecting is performed by filtering at least one signal frequency corresponding to a dial tone signal frequency.

4. A voice recognition telephone dialing system that does not require manual activation, comprising:

a dial tone removal circuit, coupled to a telephone line and active at least when the telephone line is in a dial ready state, to remove signal components in a predetermined frequency range;

a voice recognition unit with an input connected to an output of said dial tone removal circuit; and a dialing signal generator responsive to said voice recognition unit and coupled to said telephone line.

5. A voice recognition telephone dialing system according to claim 4, wherein said dialing signal generator is a tone generator.

6. A voice recognition telephone dialing system according to claim 4, wherein said dialing signal generator is a pulse generator.

7. A voice recognition telephone dialing system according to claim 4, wherein said dial tone removal circuit is a filter.

8. A voice recognition telephone dialing system according to claim 4, wherein said dial tone removal circuit is a blocking circuit.

9. A voice recognition telephone dialing system according to claim 7, wherein said filter is a band reject filter.

10. A voice recognition telephone dialing system according to claim 7, wherein said filter is a notch filter.

11. A voice recognition telephone dialing system according to claim 7, wherein said filter is a digital signal processing filter.

12. A voice recognition telephone dialing system according to claim 7, wherein said filter is a digital signal processing mask.

13. A voice recognition telephone dialing system according to claim 7, wherein said filter comprises a plurality of filters.

14. A voice recognition telephone dialing system according to claim 4, wherein said dial tone removal circuit is a phase cancellation circuit.

15. A voice recognition telephone dialing system, comprising:

means for recognizing a voice instruction and generating a predetermined dialing sequence corresponding to a recognized instruction; and means, connected to an input of said means for recognizing, for blocking signals in a predetermined frequency range including at least a dial tone signal, and passing other signals outside said predetermined frequency range to said means for recognizing.

16. A voice recognition telephone dialing system according to claim 15, further comprising:

means, connected to a telephone line, for detecting status of said telephone line;

means for generating a telephone dialing signal in response to said dialing sequence; and a means for controlling connected to said means for recognizing a voice instruction and generating a predetermined dialing sequence corresponding to a recognized instruction, said means for detecting and said means for generating.

17. A voice recognition telephone dialing system according to claim 4 wherein said dial tone removal circuit is implemented by a digital signal processing routine integrated with said voice recognition unit.

18. A method for dialing a telephone, comprising the steps of:

verifying that a telephone line is in a dial-ready state;

adding a voice instruction signal to a dial tone signal on a telephone line wherein the sum of said voice instruction signal and said dial tone signal is a combined signal;

subtracting at least the dial tone signal from the combined signal and passing the remainder of the voice instruction signal to a voice recognizer;

recognizing the remainder of the voice instruction signal; and generating a prestored dialing sequence corresponding to said voice instruction upon recognition.

* * * * *